United States Patent [19]

Kimira et al.

[11] 4,299,622
[45] Nov. 10, 1981

[54] MAGNETIC ALLOY

[75] Inventors: Hiroshi Kimira; Kenji Abiko; Takashi Sato; Isamu Yoshii, all of Sendai; Sadao Watanabe, Izumi; Yutaka Takei, Sendai, all of Japan

[73] Assignee: Sony Corporation, Tokyo, Japan

[21] Appl. No.: 91,033

[22] Filed: Nov. 5, 1979

[30] Foreign Application Priority Data

Nov. 6, 1978 [JP] Japan ............................... 53-136563

[51] Int. Cl.$^3$ ............................................. C22C 38/06
[52] U.S. Cl. .................................. 75/124; 75/123 D; 75/123 L
[58] Field of Search ............. 75/124 R, 124 A, 124 B, 75/124 C, 124 E, 124 F, 123 D, 123 L, 123 M, 126 D, 126 K, 126 Q; 148/31.55, 31.57

[56] References Cited

U.S. PATENT DOCUMENTS

| | | | |
|---|---|---|---|
| 2,186,659 | 1/1940 | Vogt .................................. | 75/124 R |
| 2,193,768 | 3/1940 | Masumoto et al. ................ | 75/124 R |
| 2,843,478 | 7/1958 | Cost .................................. | 75/124 R |
| 2,899,346 | 8/1959 | Péras ................................. | 75/124 A |
| 3,392,013 | 7/1968 | Oldfield ............................ | 75/124 A |
| 3,698,964 | 10/1972 | Caule et al. ....................... | 75/124 E |
| 3,971,678 | 7/1976 | Vlad ................................. | 148/31.55 |
| 4,065,330 | 12/1977 | Masumoto et al. ............... | 75/124 R |
| 4,131,456 | 12/1978 | Peregudou et al. .............. | 75/124 A |
| 4,168,187 | 9/1979 | Takayanagi et al. ............ | 148/31.55 |

*Primary Examiner*—L. Dewayne Rutledge
*Assistant Examiner*—John P. Sheehan
*Attorney, Agent, or Firm*—Hill, Van Santen, Steadman, Chiara & Simpson

[57] ABSTRACT

A magnetic alloy which contains not less than 0.03 weight % but not more than 5.0 weight % of P not less than 3.0 weight % but not more than 26.0 weight % of Al and Si totally (where Al is not less than 0.01 weight % but not more than 13.0 weight % and Si is not less than 0.01 weight % but not more than 13.0 weight %), the remaining part of the alloy consists mainly of Fe and the alloy is characterized in that P is presented on the grain boundary thereof with the amount more than 0.5 weight % of the atoms which form said grain boundary.

2 Claims, No Drawings

MAGNETIC ALLOY

BACKGROUND OF THE INVENTION

1. Field of the Invention

The present invention relates to magnetic alloys especially to iron-aluminum-silicon alloys.

2. Description of the Invention

Fe-Al-Si (iron-aluminum-silicon) alloys i.e. sendust alloys have such feature that the alloys are high in permeability $\mu$, great in saturation induction Bs and small in coercive force $H_c$, and also since the alloys are high in Vickers hardness, they are suitable for use as a core material of a magnetic head. Especially, recently high density recording has been promoted, and in case of a magnetic recording medium using a magnetic material with high coercive force, such magnetic heads, which will record a signal on the above magnetic recording medium and erase the recorded signal thereon, are required to be made of a core material with especially high saturation induction Bs. As the core material of the above magnetic head, the Fe-Al-Si alloys become into the spotlight. However, the Fe-Al-Si alloys are very brittle and hence it is almost impossible to subject the alloys to forging and rolling processes.

In order to provide a laminated core, which will be used to produce a magnetic head having a narrow track width or to improve the deterioration of high frequency characteristic of a magnetic head for a video signal (high frequency signal), which is caused by eddy current loss, it is necessary that Fe-Al-Si alloys are worked to be a thin plate. In general, in order to work such a kind of alloys to a thin plate, an ingot which is made by casting not by forging or rolling is sliced and then polished to be a desired thin plate.

Since the ingot is damaged easily due to its brittleness and internal stress is generated therein by the above method frequently, the above method is not satisfactory for mass-production.

The sendust alloys were reported on pages 127 to 135, vol, 1 (1937) of Journal of Japan Institute of Metals of the thesis on "Magnetic and Electrical Properties of New Alloys 'Sendust' and Fe-Al-Si Alloys" and many tries to improve the sendust alloys have been carried out for 40 years or more. The tries can be generally classified as the following two kinds. One is to improve the magnetic property as well as wear resistance, workability and corrosion resistance of the sendust alloys by adding a suitable element thereto and the other relates to the method of making and working this kind of alloys. As one example of the former, there is proposed a wear resistance high permeability magnetic alloy containing as main component, 3.0 to 13.0 weight % of Si and 3.0 to 10.0 weight % of Al and remaining Fe added with 0.1 to 7.0 weight % of Y which are melted and then hardened as disclosed in the Japanese published unexamined patent application No. 88418/76. Further, the Japanese published unexamined patent application No. 88419/76 discloses, as the wear resistance high permeability magnetic alloy, an alloy which contains as main component 3.0 to 13.0 weight % of Si, 3.0 to 10.0 weight % of Al and Fe alloy containing 0.1 to 7.0 weight % of Y and 0.1 to 3.0 weight % of at least one of Ti, Zr and lanthanide elements. Also, the Japanese published unexamined patent application No. 115696/76 discloses a wear resistance high permeability alloy which contains 3 to 13 weight % of Si, 3 to 13 weight % of Al, 0.01 to 7 weight % of Ce and the remaining part being Fe as its main component, and the Japanese published unexamined patent application No. 145421/76 discloses a wear resistance high pemeability magnetic alloy which contains 5 to 12 weight % of Si, 4 to 8 weight % of Al, 0.05 to 6 weight % of Ce, 0.1 to 3 weight % of at least one element of Ti, Zr and lanthanide elements (except Ce) and the remaining part of Fe as the main component, and the Japanese published unexamined patent application No. 128618/76 discloses a wear resistance high permeability magnetic alloy which contains 3.0 to 13.0 weight % of Si, 3.0 to 13.0 weight % of Al, 0.01 to 7.0 weight % of La and the remaining part of Fe. Further the Japanese published unexamined patent application No. 4420/77 discloses a wear resistance high permeability magnetic alloy which contains, as its main component, 3 to 13 weight % of Si, 3 to 13 weight % of Al, 0.01 to 7 weight % of La, at least one element of Ti, Zr and lanthanide elements (except Ce and La) and the remaining part of Fe, and the Japanese published unexamined patent application No. 41622/76 discloses the method of making a magnetic alloy whose wear resistance is improved by which 6 to 12 weight % of Si, 3 to 8 weight % of Al and 80 to 91 weight % of Fe are added with 0.3 to 7 weight % of Ti and the resultant mixture is subject to a suitable thermal treatment. The Japanese published unexamined patent application No. 56397/77 discloses a wear resistance high permeability magnetic alloy which contains, as its main component, 2 to 9 weight % of Al, 4 to 12 weight % of Si, 2 to 16 weight % of Cr and the remaining part of Fe. The Japanese published unexamined patent application No. 119298/75 discloses a corrosion resistance high permeability magnetic alloy containing, as its main component, 2.5 to 17 weight % of Al, 4 to 16 weight % of Si, 0.2 to 15 weight % of Cr, 0.2 to 10 weight % of Ni and the remaining part of Fe. The Japanese published unexamined patent application No. 94822/77 discloses a non-brittle high permeability magnetic alloy which is provided by adding 0.01 to 4.5 weight % of Ti and 0.005 to 1.5 weight % of C to a sendust alloy or sendust alloys, and the Japanese published unexamined patent application No. 30388/76 discloses that it is possible that a magnetic alloy for magnetic head of 3 to 8 weight % of Si, 2 to 5 weight % of Al, less than 6 weight % of Ni and the remaining part of Fe can be made as a thin plate with the thickness of 0.05 mm by hot rolling. While, as read on "The Magnetic Characteristics of 'Super Sendust (II)' of Fe-Si-Al-Ni Alloys" on page 179 of Proceeding of Autumn Conference on Magnetics held 1978, an alloy consisting of 4 to 8 weight % of Si, 2 to 6 weight % of Al, 0 to 7 weight % of Ni and the remaining part of Fe can be subjected to warm rolling and also is superior in magnetic property but its Vickers hardness $H_v$, which is intimate to the wear resistance property, is 410 which is lower than the prior art sendust alloys by about 100. The Japanese published unexamined patent application No. 121427/76 discloses such an alloy consisting of 3 to 8 weight % of Si, 2 to 5 weight % of Al, not more than weight % of Ni and the remaining part of Fe which can be rolled to a thin plate having the thickness of 0.2 mm by hot rolling and cold rolling. The Japanese published unexamined patent application No. 138012/77 discloses a magnetic alloy consisting mainly of 3 to 8 weight % of Al, 3 to 12 weight % of Si, 0.01 to 5 weight % of Y and the remaining part of Fe whose workability, wear resistance and corrosion resistance are improved.

Meanwhile, as to the latter i.e. method of making the sendust alloys and working method thereof, there are a number of reports. For example, according to "The High Purity Sendust and its Application to a Magnetic Head" described on pages 75 to 80, August, 1977 of the magazine "Denshi-zairyo (Electronic parts and Materials)", it is possible after closely examining the material of the sendust that a sendust ingot good or with a uniform grain structure and without defect, pin holes and residual strain can be made by vacuum centrifugal casting. The Japanese published unexamined patent application No. 38097/75 discloses such a method in which a raw meterial with the alloy composition of 8 to 11 weight % of Si, 4 to 8 weight % of Al and 83 to 86 weight % of Fe is melted and cast, then ground as powders, and the powders are molded and then the molded material is hot pressed at 900 to 1250° C. under the pressure more than 150 kg/cm². Further, in the thesis "Powder Rolling Method of Sendust Alloy and Electromagnetic Characteristics Thereof" on pages 20 to 27 of Journal of the Japan Society of Powder and Powder Metallurgy Vol. 14, January, 1967 there is a description that mechanically crashed powders and spray cooled powders are subjected to the powder rolling to provide a sendust sheet having the thickness of 0.6 to 0.8 mm. The Japanese published examined patent application No. 26505/77 discloses the fact that a sendust alloy ingot is sealed in a sheath member through a heat insulator, heated at the temperature range of 900° to 1100° C., and then rolled by 15 times of rollings from the thickness of 5 mm to be the thickness of 0.23 mm. Further, in the thesis "mechanical and magnetic properties of few hot forged Fe-Al-Si alloy" on pages 922 to 926, vol. 37 No. 8 (1973) of Journal of the Japan Institute of Metal, there is such a description that after the sendust consisting of 6.44 weight % of Al, 10.32 weight % of Si, 0.68 weight % of Ti and the remaining part of Fe is subjected to the bending test and sheath forging test by a thin sheath member at 800° to 1000° C., 70% of deformation due to compression can be given thereto by forging at 1000° C. and plastic deformation appears therein even at 800° C. The Japanese published unexamined patent application No. 123919/77 discloses a method where a melted alloy whose main component is Fe-Al-Si is cast in a chilled mold, whole the ingot is cooled at the cooling speed higher than at least 200° C./min. to provide a high grade ingot. In "manufacturing of sendust sheet by the spark sintering and the electromagnetic property thereof" on pages 5 to 13, Vol. 15, No. 1 (1968) of Journal of the Japan Society of Powder and Powder metallurgy, there is reported the fact that a sendust sheet can be made by spark-sintering a powder consisting of 5.38 weight % of Al, 9.26 weight % of Si and the remaining part of Fe and having the grain size of 325 mesh. The Japanese published unexamined patent application No. 56313/75 discloses such a method in which the powders of an alloy consisting of 5 to 12 weight % of Si, 3 to 8 weight % of Al and the remaining part of Fe are sealed in a can and then is subjected to the hot extrusion at the temperature range of 900° to 1280° C. with the ratio of rolling reduction more than 3 to make an alloy whose grain size is smaller than 30 μm. The Japanese published unexamined patent application No. 138517/76 discloses such a method in which levitated Fe-Al alloys or Fe-Al-Si alloys by high frequency induction heating is made as a thin plate by a steel roll, and the Japanese published unexamined patent application No. 123314/77 discloses a method of making ribbon shaped sendust alloys.

As described above, there are investigations which will improve superior various magnetic properties of the Fe-Al-Si alloys and also improve their mechanical property such as workability, wear resistance, corrosion resistance and so on, and also there are many investigations and reports which work the alloys with a desired shape without loosing their superior magnetic properties by developing the special melting method, working method and molding method.

However, up to now there has not been proposed Fe-Al-Si alloys in the art which have superior magnetic properties, are superior for mass-production and yield, capable of being forged and rolled to be made into a sufficiently thin plate.

OBJECT AND SUMMARY OF THE INVENTION

It is an object of the present invention to provide an improved magnetic alloys having superior magnetic properties.

It is another object of the present invention to provide Fe-Si-Al alloys having superior magnetic properties.

It is further object of the present invention to provide Fe-Si-Al alloys which can be subjected to the rolling work method without injuring superior magnetic properties.

According to the present invention, phosphor P is added to the Fe-Al-Si alloys and P is presented on the grain boundary more than a specified amount to thereby improve the brittleness on the grain boundary, strengthen the grain boundary and hence enhance the workability remarkably.

DESCRIPTION OF THE PREFERRED EMBODIMENTS

The present invention will be hereinafter described. On the grain boundary of a Fe-Al-Si-P alloy which consists of 0.03 to 5.0 weight % of P, totally 3.0 to 26.0 weight % of Al and Si (where Al is 0.01 to 13.0 weight % and Si is 0.01 to 13.0 weight %) and the remaining parts mainly of Fe (the remaining part can contain a little amount of other elements as an additive but the main component thereof is Fe), there is presented P whose amount exceed 0.5 weight % of the atoms which form the grain boundary by, for example, segregation.

Further, in this invention, in place of Fe in the remaining part of the Fe-Al-Si-P magnetic alloy, there is used as a sub-component at least one of the elements selected from not more than 5.0 weight % of Ti, not more than 5.0 weight % of V, not more than 7.0 weight % of Cr, not more than 5.0 weight % of Mn, not more than 5.0 weight % of Co, not more than 7.0 weight % of Ni, not more than 6.0 weight % of Cu, not more than 5.0 weight % of Ge, not more than 5.0 weight % of Y, not more than 5.0 weight % of Zr, not more than 6.0 weight % of Nb, not more than 5.0 weight % of Mo, not more than 5.0 weight % of Hf, not more than 5.0 weight % of Ta, not more than 5.0 weight % of W, not more than 3.0 weight % of rare earth elements, not more than 0.5 weight % of B, not more than 0.5 weight % of Ca, not more than 0.8 weight % of C, not more than 0.1 weight % of N, not more than 3.0 weight of Sn, not more than 3.0 weight % of Sb, not more than 0.5 weight % of Pb and not more than 3.0 weight % of Be, with totally not less than 0.01, but not more than 10.0 weight %. In this case, the phosphor P is presented on the grain boundary with the amount exceeding 0.5 weight % for the atoms which form the grain boundary. The added elements Ti, V, Ge, Zr, Nb, Mo, Hf, Ta, W, Sn and Sb are used to increase the hardness of the alloy, the added elements Mn, Ni, Cu, Y, rare earth elements, B, Pb and Be are used to increase the rolling capability and workability of the alloy, and the added Cr is used to improve the corrosion resistance of the alloy, respectively.

Further, C and N are respectively added to provide carbide and nitride to thereby increase the strength of the alloy, and Ca is added to provide a good ingot i.e. prevent crack and extraordinary grain structure from being generated in the alloy by the deoxidization action of Ca. When the added amount of B is not less than 0.001 weight %, the adding effect thereof appears, while when the adding amounts of the other elements i.e. Ti, V, Cr, Mn, Co, Ni, Cu, Ge, Y, Zr, Nb, Mo, Hf, Ta, W rare earth elements, Ca, C, N, Sn, Pb, and Be are not less than 0.01 weight %, their adding effects appear.

According to the present invention, the raw material of the magnetic alloy is melted and then cast, and if necessary, cooled slowly with controlled cooling ratio or annealed at the temperature of 500° to 1100° C. to be the magnetic alloy. When a thin plate is made from the thus made magnetic ally, the ingot made by the casting is cut in the shape of a plate, the thus made plate is subjected to the hot rolling treatment at 800° to 1100° C. repeatedly several times, if necessary, to form a thin plate with the thickness thinner than 300 μm, for example, about 200 μm, and the thus obtained thin plate is cold-rolled. By repeating the cold rolling for a desired times, the plate can be made to have the thickness of about several micro-meters. The thin plate thus made is subjected to the thermal treatment in the atmosphere of $H_2$ at 500° to 1200° C. so as to improve its magnetic characteristics.

Next, an example of the present invention will be described.

EXAMPLE

A total amount of 500 g of materials, which contains electrolytic refined iron consisting of 99.999% Si and Fe25% P (ferro-phosphor mother alloy containing 25 weight % of phosphor) and various added elements, were subjected to the induction melting by using a crucible made of alumina which was located in a vacuum furnace under the pressure of less than $1 \times 10^{-4}$ mm Hg, and the melted alloy thus made was poured into a mould and then cast in the vacuum furnace. This casting was carried out by the following first and second methods. The first method was an ordinary casting method in which the casting by a metal mould was carried out. The second method was a method wherein a tape heater was wound on the outer side of the mould, the mould was held at about 500° C., then the melted alloy was poured into the mould, and then gradually cooled between the temperature range from 800° C. to 500° C. at a cooling speed of 2.5° C./min, and after the temperature arrived at 500° C., the power supply to the heater was turned off to cool same to the room temperature. From the ingots obtained by the first and second methods, thin plates of 5 mm×30 mm×20 mm were cut. Thus made thin plates were subjected to the hot rolling at 600° to 1100° C. and then to the cold rolling.

The measured mechanical characteristics i.e. rolling capability, hardness and magnetic characteristic of samples with various component ratios are shown in the following Table I.

TABLE I

| Sample | Principal component (Weight %) | | | | Sub-component (Weight %) | Rolling capability | Vickers hardness | Magnetic characteristics | | |
|---|---|---|---|---|---|---|---|---|---|---|
| | Fe | Si | Al | P | | | | $B_{10}$ Oe (gauss) | μ(1KHz) | Hc(Oe) |
| 1a | residual | | | | | X | | | | |
| 1b | part | 6.5 | 8.0 | | | X | 490 | 11,300 | 2,800 | 0.03 |
| 2a | residual | | | | | X | | | | |
| 2b | part | 9.1 | 4.7 | | | X | 497 | 11,500 | 2,500 | 0.05 |
| 3a | residual | | | | | X | | | | |
| 3b | part | 6.7 | 7.9 | 0.04 | | Δ | | | | |
| 4a | residual | | | | | X | | | | |
| 4b | part | 6.5 | 8.1 | 0.30 | | Δ | | | | |
| 5a | residual | | | | | Δ | | | | |
| 5b | part | 6.4 | 8.2 | 0.57 | | Δ | | | | |
| 6a | residual | | | | | Δ | | | | |
| 6b | part | 6.5 | 8.2 | 0.89 | | O | | | | |
| 7a | residual | | | | | O | | | | |
| 7b | part | 6.3 | 8.0 | 1.02 | | O | 642 | 10,480 | 2,900 | 0.04 |
| 8a | residual | | | | | O | | | | |
| 8b | part | 6.1 | 8.5 | 4.62 | | O | | | | |
| 9a | residual | | | | | Δ | | | | |
| 9b | part | 7.1 | 7.3 | 0.91 | Cr 2.0 Mo 1.0 | O | 651 | 10,200 | 3,300 | 0.05 |
| 10a | residual | | | | | Δ | | | | |
| 10b | part | 7.8 | 7.1 | 1.05 | Cr 3.2 Ni 1.0 | O | 601 | 11,300 | 3,700 | 0.04 |
| 11a | residual | | | | | O | | | | |
| 11b | part | 6.8 | 7.1 | 1.01 | Cr 1.8 Mn 0.5 | O | 623 | 10,800 | 3,450 | 0.05 |
| 12a | residual | | | | | Δ | | | | |
| 12b | part | 6.7 | 7.7 | 0.96 | Cr 3.2 | O | 635 | 10,200 | 2,900 | 0.05 |
| 13a | residual | | | | | O | | | | |
| 13b | part | 6.5 | 7.9 | 1.03 | Mo 1.0 | O | 608 | 10,850 | 3,700 | 0.04 |
| 14a | residual | | | | | Δ | | | | |
| 14b | part | 6.4 | 7.8 | 1.10 | Mn 3.1 | O | 609 | 10,500 | 2,800 | 0.05 |
| 15a | residual | | | | | Δ | | | | |
| 15b | part | 6.5 | 7.9 | 0.98 | Ni 2.1 | O | 572 | 10,800 | 3,200 | 0.05 |
| 16a | residual | | | | | Δ | | | | |
| 16b | part | 6.3 | 7.8 | 1.03 | Ti 1.5 | O | | | | |
| 17a | residual | | | | | Δ | | | | |
| 17b | part | 6.8 | 7.7 | 1.20 | V 1.0 | O | | | | |
| 18a | residual | | | | | Δ | | | | |

TABLE I-continued

| Sample | Principal component (Weight %) Fe | Si | Al | P | Sub-component (Weight %) | Rolling capability | Vickers hardness | Magnetic characteristics B₁₀ Oe (gauss) | μ(1KHz) | Hc(Oe) |
|---|---|---|---|---|---|---|---|---|---|---|
| 18b | part | 6.8 | 7.7 | 1.08 | Co 2.8 | ○ | | | | |
| 19a | residual | | | | | Δ | | | | |
| 19b | part | 6.5 | 7.8 | 0.97 | Cu 1.9 | ○ | | | | |
| 20a | residual | | | | | Δ | | | | |
| 20b | part | 6.6 | 7.6 | 0.92 | Ge 1.4 | ○ | | | | |
| 21a | residual | | | | | Δ | | | | |
| 21b | part | 6.4 | 7.5 | 1.01 | Y 0.8 | ○ | | | | |
| 22a | residual | | | | | Δ | | | | |
| 22b | part | 6.7 | 7.9 | 0.96 | Zr 1.1 | ○ | | | | |
| 23a | residual | | | | | Δ | | | | |
| 23b | part | 6.3 | 7.4 | 0.99 | Nb 1.4 | ○ | | | | |
| 24a | residual | | | | | Δ | | | | |
| 24b | part | 6.5 | 7.2 | 1.12 | Mo 1.5 | ○ | | | | |
| 25a | residual | | | | | Δ | | | | |
| 25b | part | 6.6 | 7.3 | 1.20 | Hf 1.4 | ○ | | | | |
| 26a | residual | | | | | Δ | | | | |
| 26b | part | 6.2 | 7.8 | 1.11 | Ta 1.0 | ○ | | | | |
| 21a | | | | | | | | | | |
| 27a | residual | | | | | Δ | | | | |
| 27b | part | 6.4 | 7.5 | 0.95 | W 0.8 | ○ | | | | |
| 28a | residual | | | | | ○ | | | | |
| 28b | part | 6.2 | 7.4 | 0.98 | B 0.006 | ○ | | | | |
| 29a | residual | | | | | Δ | | | | |
| 29b | part | 6.8 | 7.1 | 1.00 | Ca 0.02 | ○ | | | | |
| 30a | residual | | | | | Δ | | | | |
| 30b | part | 6.5 | 7.7 | 0.89 | C 0.05 | ○ | | | | |
| 31a | residual | | | | | Δ | | | | |
| 31b | part | 6.8 | 7.9 | 0.92 | N 0.03 | Δ | | | | |
| 32a | residual | | | | | ○ | | | | |
| 32b | part | 6.5 | 7.5 | 1.12 | La 1.2 | ○ | | | | |
| 33a | residual | | | | | ○ | | | | |
| 33b | part | 6.4 | 7.4 | 1.08 | Sn 1.5 | ○ | | | | |
| 34a | residual | | | | | ○ | | | | |
| 34b | part | 6.6 | 7.2 | 0.94 | Sb 1.1 | ○ | | | | |
| 35a | residual | | | | | Δ | | | | |
| 35b | part | 6.7 | 7.9 | 0.99 | Be 0.8 | ○ | | | | |
| 36a | residual | | | | | Δ | | | | |
| 36b | part | 6.6 | 7.1 | 1.05 | Pb 0.05 | ○ | | | | |

In the above Table I, numbers of samples with a letter a represent the samples made by the first casting method and those with a letter b represent the samples made by the second casting method, respectively. Further, in the Table I the samples with the numbers 4 to 36 except that 4a represent the magnetic alloys according to the present invention and the samples with the numbers of 1 to 3 and 4a represent magnetic alloys different from the present invention but made by the casting methods similar to the invention for comparison.

In the above Table I, the measurements of Vickers hardness and magnetic characteristics were carried out on the plates cut out from the respective ingots before being rolled. Especially, rings for measuring the magnetic characteristics were made from the plates by the spark cutting with the outer diameter of 10 mm, the inner diameter of 6 mm and the thickness of 1.0 mm. The rings were subjected to the thermal treatment at 500° to 1200° C. in H₂ atmosphere and then the above measurements were carried out. That is, the magnetic flux density $B_{10\,Oe}$ under the applied magnetic field of 10 $O_3$, and the magnetic permeability $\mu_1\,KHz$ and coercive force $H_c$ for the alternative magnetic field of 1 KHz were measured. The mark ○ on the column of the rolling capability in the Table I indicates a case were the plate with the thickness of 5 mm was subject to the hot rolling by ten and several times to have the thickness less than 1 mm with no crack, the mark Δ indicates a case where some cracks appeared but good rolling capability was observed and the mark X indicates a case where a number of cracks appeared by several times of hot rolling and the rolling became impossible.

The following Table II shows the results of the Auger electron spectroscopy on the fractured surface of some samples and shows the relation between the amount of segregated P on the grain boundary and rolling capability.

TABLE II

| No. | Amount of P (weight %) | Amount of P on grain boundary (weight %) | Rolling capability |
|---|---|---|---|
| 1b | 0.00 | 0.0 | X |
| 4a | | 0.3 | X |
| 4b | 0.3 | 0.5 | Δ |
| 5a | | 0.5 | Δ |
| 5b | 0.57 | 0.7 | |
| 7a | 1.02 | 1.0 | |
| 11a | 1.01 | 1.0 | |

As may be understood from the Table I, the samples 1 to 3, in which the added amount of P is small, show low rolling capability but the samples with more P added than 0.30 weight % show improved rolling capability. Also, as may be understood from the Table II, even though the amount of P is the same, for example, as in the samples 4a and 4b, the sample 4b in which the amount of segregated P on the grain boundary is more than that in the sample 4a shows better rolling capability than the latter. That is, in the case where the adding amount of P is small, P is segregated on the grain boundary by the thermal treatment such as the heating and gradual cooling process as in the above second method and, as a result, the rolling capability is improved. In other words, when the added amount of P is 0.03 to 0.5 weight %, after suitable thermal treatment, P is segregated on the grain boundary with the amount more than 0.5 weight % for the grain boundary, while when the adding amount of P exceeds the 0.5 weight %, P more than 0.5 weight % presents on the grain boundary without special thermal treatment. It is ascertained if P more than 0.5 weight % exists on the grain boundary, the superior rolling capability appears.

As described above, the magnetic alloy according to the present invention shows superior rolling capability. This fact depends upon the existence of P on the grain boundary not upon the sub-component as may be apparent from the samples 4b and 5 to 8 shown in Table I. In order to present more that 0.5 weight % of P on the grain boundary, the total amount 0.03 weight % of P is at least necessary. However, when the added amount of P exceeds 5.0 weight %, good cast material is not produced and the cast material becomes low in magnetic characteristics. Accordingly, the added amount of P is selected between 0.03 to 5.0 weight %. Further, in order to provide a magnetic alloy which has superior rolling capability irrespective of the method of making it, the added amount of P is desired to be selected more than 0.5 weight % but less than 5.0 weight %.

Further, the reason why the amount of Al and Si is selected as 3.0 to 26.0 weight % in the total amount thereof and respective Al and Si are selected as 0.01 to 13.0 weight % is that if each of Al and Si is not more than 0.01 weight % or the total amount of Al and Si is not more than 3.0 weight %, the alloy is superior in workability but low in magnetic characteristics and wear proof, while when each of Al and Si exceeds 13.0 weight %, the alloy becomes low in both workability and magnetic characteristics. Further, when each of sub-components i.e. Ti, V, Mn, Co, Ge, Y, Zr, Mo, Hf, Ta, and W exceeds 5.0 weight %, Cr, and Ni, exceeds 7.0 weight %; Cu and Nb exceeds 6.0 weight %; rare earth elements, Sn, Sb, and Be exceed 3.0 weight %; B, Ca, and Pb exceed 0.5 weight %; C exceeds 0.8 weight %; N exceeds 0.1 weight %; and the total amount of the above sub-components exceeds 10.0 weight %, the alloy becomes low in rolling capability (workability) and magnetic characteristics.

As described above, although the magnetic alloy according to present invention shows the superior magnetic characteristics and the rolling capability thereof is greatly improved, there appears no decrease of the hardness but its vickers hardness is rather improved from 550 to 650. Since according to the present invention the hardness of the alloy at the room temperature is increased remarkably and the alloy can be rolled without problems, this invention contributes an improvement to the industry.

When the magnetic alloy according to the present invention is used as the core material of a magneic head, even if the magnetic head is narrow in track width or of the type of a laminated core, the magneric head can be massproduced by the rolling works with high yield and the magnetic head thus made is superior in wear resistance due to its improved hardness. Further, according to the present invention, since the magnetic alloy can be made sufficiently thin, an audio magnetic head as well as a video magnetic head can be made by laminating the thin magnetic plates. That is, by using the laminated core made by this invention, the frequency characteristics of the magnetic head can be improved in a high frequency in the order of kilo-hertz and also mega-hertz. For example, the output of a prior art head made of the sendust alloy but not of a laminated core is lower at 10 $KH_z$, while a head made of a laminated core, which is prepared by laminating the plates of the alloy of this invention, each having the thickness of 0.1 mm, shows flat frequency versus output characteristics above 15 $KH_z$.

The magnetic alloy according to the present invention can be applied not only to the core material of a magnetic head but also to the laminated core of a high frequency transformer and so on with good results.

We claim as our invention:

1. A magnetic alloy containing not less than 0.03 weight % but not more than 5.0 weight % of P, not less than 3.0 weight % but not more than 26.0 weight % of Al and Si totally (where Al is not less than 0.01 weight % but not more than 13.0 weight % and Si is not less than 0.01 weight % but not more 13.0 weight %), the remaining part consisting mainly of Fe, said alloy being characterized in that P is present on the grain boundaries thereof in an amount of more than 0.5 weight % of the atoms which form said grain boundaries.

2. A magnetic alloy containing not less than 0.03 weight % but not more than 5.0 weight % of P and not less than 3.0 weight % but not more than 26.0 weight % of Al and Si totally (where Al is not less than 0.01 weight % but not more than 13.0 weight % and Si is not less than 0.01 weight % but not more than 13.0 weight %), and containing 0.01–10% by weight in total of at least one element selected from the group consisting of

| | |
|---|---|
| Ti | not more than 5.0 weight % |
| V | " |
| Cr | not more than 7.0 weight % |
| Mn | not more than 5.0 weight % |
| Co | " |
| Ni | not more than 7.0 weight % |
| Cu | not more than 6.0 weight % |
| Ge | not more than 5.0 weight % |
| Y | " |
| Zr | " |
| Nb | not more than 6.0 weight % |
| Mo | not more than 5.0 weight % |
| Hf | " |
| Ta | " |
| W | " |
| Rare earth elements | not more than 3.0 weight % |
| B | not more than 0.5 weight % |
| Ca | " |
| C | not more than 0.8 weight % |
| N | not more than 0.1 weight % |
| Sn | not more than 3.0 weight % |
| Sb | " |
| Pb | not more than 0.5 weight % |
| Be | not more than 3.0 weight % | the remaining part consisting mainly of Fe, said alloy being characterized in that P is present on the grain boundaries thereof in an amount of more than 0.5 weight % of the atoms which form said grain boundaries.

* * * * *

UNITED STATES PATENT AND TRADEMARK OFFICE
CERTIFICATE OF CORRECTION

PATENT NO. : 4,299,622
DATED : November 10, 1981
INVENTOR(S) : Kimura et al

It is certified that error appears in the above—identified patent and that said Letters Patent is hereby corrected as shown below:

In the Title Page, under "United States Patent" and under Title, please change "Hiroshi Kimira" to --Hiroshi Kimura--.

Signed and Sealed this

Fifteenth Day of March 1983

[SEAL]

Attest:

GERALD J. MOSSINGHOFF

Attesting Officer    Commissioner of Patents and Trademarks